US006340068B1

(12) United States Patent

Frey et al.

(10) Patent No.: US 6,340,068 B1

(45) Date of Patent: Jan. 22, 2002

(54) USE OF A MATERIAL WITH A HIGH INTERNAL DAMPING FOR A COMPONENT OF A SOUND-EMITTING MACHINE

(75) Inventors: Jürgen Frey, Fellbach; Ulrike-Christiane Huber, München; Jürgen Schnur, Ditzingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/413,853

(22) Filed: Oct. 7, 1999

(30) Foreign Application Priority Data

| | | |
|---|---|---|
| Oct. 7, 1998 | (DE) | 198 46 118 |
| Oct. 7, 1998 | (DE) | 198 46 117 |

(51) Int. Cl.[7] .......... F16F 7/00

(52) U.S. Cl. .......... 181/207; 181/208; 181/200; 181/202; 181/203; 181/204

(58) Field of Search .......... 181/207, 208, 181/200, 202, 203, 204; 148/431, 240, 442; 428/615, 617

(56) References Cited

U.S. PATENT DOCUMENTS

| | | | | | |
|---|---|---|---|---|---|
| 3,558,369 A | | 1/1971 | Wong et al. | |
| 3,693,750 A | * | 9/1972 | Takkunen | 181/33 G |
| 3,825,887 A | * | 7/1974 | Murry | 340/15 |
| 3,895,143 A | * | 7/1975 | Tarlow | 428/40 |
| 4,193,474 A | * | 3/1980 | Okubo et al. | 181/287 |
| 4,281,223 A | * | 7/1981 | Ugaji et al. | 179/115 R |
| 4,684,414 A | | 8/1987 | Matsumoto et al. | |
| 5,005,678 A | * | 4/1991 | Julien et al. | 188/378 |
| 5,884,843 A | * | 3/1999 | Lidstone et al. | 239/265.13 |
| 6,070,695 A | * | 6/2000 | Ohtaaka et al. | 181/282 |

FOREIGN PATENT DOCUMENTS

| | | |
|---|---|---|
| DE | 1558715 | 3/1972 |
| DE | 19741019 A | 4/1999 |
| DE | 198 26 175 | 12/1999 |
| JP | 50-31097 | 10/1975 |
| JP | 52-119409 | 10/1977 |

* cited by examiner

*Primary Examiner*—Robert E. Nappi
*Assistant Examiner*—Kim Lockett
(74) *Attorney, Agent, or Firm*—Crowell & Moring LLP

(57) ABSTRACT

A sound generating or emitting machine having a component comprising a material with a high internal damping and tensile strength, the material comprising (1) a metallic base material, and (2) a metallic second phase with an at least partially martensitic structure. The material may also be an alloy comprising a base material in which additional alloy elements have a very low solubility.

24 Claims, No Drawings

USE OF A MATERIAL WITH A HIGH INTERNAL DAMPING FOR A COMPONENT OF A SOUND-EMITTING MACHINE

BACKGROUND AND SUMMARY OF INVENTION

This application claims the priority of German Patent Documents 198 46 117.8 and 198 46 118.6, filed Oct. 7, 1998, the disclosures of which are expressly incorporated by reference herein.

The present invention relates to the use of a material with a high internal damping for a component of a sound-emitting machine. The component is arranged inside or outside the sound-generating or sound-conducting flux of force of the machine.

The high acceleration of mechanically moved parts causes undesirable vibrations in a wide frequency spectrum. This is particularly noticeable in the case of machines with rotating parts, for example, internal-combustion engines. In order to at least reduce such sounds, different solutions are suggested. Thus, for example, particularly in vehicle construction, passive measures are often used, such as damping mats, vibration dampers, and the like. Furthermore, active measures, such as influencing the airborne sound in an occupant compartment (active noise control) by means of acoustic interference is also used for reducing a perceived disturbing sound.

Another measure is known from German Patent Document DE-P 198 26 175, which discloses that it is advantageous to place into a transmission path of a sound (i.e., the flux of force between an exciting component and a component that transmits this excitation to an element radiating the sound, particularly as a disturbing noise), a device by means of which the intensity of the flux of force between the component from which the flux of force originates and the component to which the flux of force is transmitted is at least reduced.

The above-mentioned measures require, among other things, high technological, materials-related, and sometimes also financial expenditures. In addition, these measures increase the overall weight of the machine, which is undesirable, particularly in automobile construction.

It is an object of the present invention to provide a simple possibility for influencing noise emitted from a machine at reasonable cost.

In the case of components which are arranged within the sound-generating or -conducting flux of force, this object is achieved by the use of a material according to the present invention. In the case of components which are arranged outside the sound-generating or -conducting flux of force and act as a membrane for the sound, this object is achieved by the use of a material according to the present invention, in which case such components may be made of these materials only in regions.

DETAILED DESCRIPTION OF INVENTION

The metallic material known from German Patent Document DE-P 197 41 019 (which is not a prior publication) despite its high tensile strength typical of metals and its high ductile yield, has an internal damping which is unusually high for metals. As the result of the characteristics of the material known from German Patent Document DE-P 197 41 019, the intensity of the sound radiated on the end side, or the flux of force of the structure-borne sound conduction, is at least reduced. The reduction of the flux of force results in the same type of reduction with respect to the sound emitted on the end side and thus of a disturbing noise. The reduction of the flux of force is based on the fact that the flux of force is first decelerated. For this reason, the resulting flux of force is reduced in the case of a harmonic excitation.

The material provided for the components arranged outside the sound-generating or -conducting flux of force has high damping characteristics even at low vibration amplitudes. In particular, in the case of a material according to the present invention, a second phase, which is at least partially martensitic, influences the mechanical characteristic values of a base material at most in a negligible manner. For this reason, this material can simultaneously be used as a structural material.

As the result of these characteristics of this material, mechanically stable components can therefore be conceived which have high damping characteristics, whereby a simple, low-cost and highly effective contribution is made to reducing the noise emanating from a machine.

The second phase is preferably an alloy. An Ni—Ti alloy was found to be advantageous whose alloy constituents are mixed between 48 and 52 atomic %. This alloy is particularly advantageous if it has 49.9 atomic % Ni and 50.1 atomic % Ti.

The internal damping may also be increased if the second phase has additions of up to 25 atomic %. The additions cause a stabilization of the martensitic phase and of the adaptation to the respective operating conditions of the respective components. In particular, such additions include zirconium and/or hafnium and/or copper and/or niobium and/or manganese and/or palladium and/or platinum and/or iron. The stabilization of the martensitic phase can take place by a pretreatment of the second phase in that, for example, a deformation of the second phase or a homogenization of the alloy constituents is carried out.

The second phase may be present as particles and/or as wires and/or as mineral fibers and/or carbon fibers, particularly as short fibers and/or as a layer in the base material. As a result, the material can ideally be adapted to the demands required for the respective component.

The proportion of the second phase in the overall material, according to the desired characteristics of the material or of the component manufactured thereof, is varied preferably between 5 and 60% by volume.

Furthermore, it is expedient to coordinate the materials of the second phase and the base material with one another such that, on their boundary surfaces, the two materials form a connection, at least in areas.

As the result of the metallic second phase with the at least partially martensitic structure within the base material, the demands which are made on the material with respect to the damping are met at least largely, particularly by the second phase alone.

Because of the low density and of its low weight, a light metal and/or a light metal alloy is used as the base material. Al alloys with the designation EN AW-6061 according to DIN EN 573 were found to be particularly advantageous.

Furthermore, base materials can also be used which have different structures or which, as composite materials, have at least a third phase for reinforcing purposes. As a result, a higher stability can be implemented.

A thermo-mechanical treatment adapted to the base material also advantageously increases the stability of the base material.

Demands made on the tensile strength and on the resistance to breaking are met and determined mainly by the base material. Particularly for this reason, the base material can be used as a structural material for any demand which is made on the concerned component.

A process for manufacturing the material used according to the present invention is contained in German Patent Document DE-P 197 41 019.

Advantageously, the material according to the present invention can also be used for components which are not only situated in the flux of force, but also simultaneously have the effect of a membrane for the sound radiation. This may apply, for example, to an oil pan.

As mentioned above, in addition to its use in components arranged in the flux of force, the above-described material can also be used for components which are arranged outside the flux of force and, in particular, have a sound-emitting characteristic.

Additional materials can be used according to the present invention for manufacturing components, which are arranged outside a sound-generating or -conducting flux of force and which, in particular, have a sound-radiating characteristic. Such materials include light metal alloys which have Mg as the base material. Mg—Si alloys and/or Mg—Zr alloys and/or Mg—Ni alloys and/or Mg—Mn alloys were found to be particularly advantageous. In the case of these alloys, the solubility of the alloy elements in the base material is very low. In particular, such an alloy has, at the lattice sites and the interstices of the base material, maximally 1%, preferably maximally 0.5% and more preferably maximally 0.1 of another element.

The above-mentioned Mg alloys all have a minimum fraction of Mg which is greater than 67 atomic %. The fraction of the second element in the alloy, in the case of Mg—Si alloys is typically a fraction of 0.5–4 atomic % Si; in the case of Mg—Zr alloys is typically a fraction of 0.2 atomic % Zr; in the case of Mg—Ni alloys is typically a fraction of 2–11 atomic % Ni; and in the case of Mg—Mn alloys is typically a fraction of up to 1 atomic % Mn.

The alloy elements of the Mg alloys react with the Mg and are present in the structure in the form of precipitations. In the case of an Mg—Si alloy, for example, $Mg_2Si$ is precipitated; in the case of an Mg—Ni alloy, for example, $Mg_2Ni$ is precipitated.

Other possible materials, for example, in addition to other binary Mg alloys, include Mg—N, Mg—Sb, Mg—Sr and Mg—Cu, and combinations of the alloy elements, such as Mg—Mn—Si.

Furthermore, Al alloys are also suitable which have alloy elements which hardly dissolve in the base Al material.

The following table contains some material data concerning the above-mentioned Mg alloys, in which the following symbols are used:

$P_{p0.2}$: for the elongation limit in MPa $R_m$: for the tensile strength in MPa and η: for the loss factor.

| | $R_{p0.2}$ | $R_m$ | η |
|---|---|---|---|
| Mg - 0.6 Atom % Si | 52 | 93 | 0.09 |
| Mg - 1.2 Atom % Si | 60 | 107 | 0.07 |
| Mg - 0.2 Atom % Zr | 47 | 152 | 0.1 |
| Mg - 0.4 Atom % Mn | 17 | 93 | 0.09 |
| Mg - 0.6 Atom % Mn | | 74 | 0.1 |
| Mg - 7.1 Atom % Ni | | | 0.003 |
| Mg - 2.5 Atom % Ni | | | 0.006 |

Despite the poorer tensile strength in comparison to the materials having Ni or Ti second phase, the above-mentioned materials can nevertheless be used for producing components which are arranged outside a sound-generating or -conducting flow of force of a machine. Also in the case of these materials, the reduction of the intensity of the radiated sound is based on an internal damping of the material.

On the whole, the materials according to the present invention can be used particularly in the case of the following machines: airplanes, helicopters, railway engines and/or cars, motor vehicles driven by engines, preferably passenger cars or trucks.

When the present invention is used in the case of motor vehicles, preferably in the case of passenger cars or trucks, the material according to the present invention is used particularly for the manufacturing of a connecting rod and/or of an engine block having a cylinder block and a crankcase and/or of a cylinder head and/or of a transmission case and/or of an automatic transmission case and/or of a clutch housing and/or of an assembly mount and/or of an engine mount and/or of a seat rail and/or of a seat support on which seats are disposed, and/or of a seat frame and/or of a differential gear, particularly of a differential case.

When a material is used outside the sound-generating or -conducting flux of force, the material is used preferably for motor vehicles and, in this case, particularly for passenger cars or trucks, the material is used particularly for the manufacturing of a timing case, of a valve hood, of an oil pan, of a suction pipe or module, of a fan blade, of a steering wheel, of a steering column tube, of an operating element, such as a pedal and the like, of a covering element, such as a vehicle body metal sheet, and the like, of a differential gear, particularly of a differential case, of a casing tube and/or of another casing of a drive shaft, and/or of a pulley.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sound-generating or sound-emitting machine having a component comprising a material with a high internal damping and tensile strength, said material comprising:

a metallic base material comprising at least one of a light metal or a light metal alloy; and a metallic alloy phase having at least a partially martensitic structure and between 48 and 52 atomic % Ni or Ti;

wherein the component is arranged in a sound-generating or sound-conducting flux of force of the machine.

2. A sound-generating or sound-emitting machine according to claim 1, wherein the phase alloy comprises approximately 49.9 atomic % Ni and approximately 50.1 atomic % Ti.

3. A sound-generating or sound-emitting machine having a component comprising a material with a high internal damping and tensile strength, said material comprising:

a metallic base material comprising at least one of a light metal or a light metal alloy; and a metallic phase with at least a partially martensitic structure and between 48 and 52 atomic % Ni or Ti;

wherein the component is arranged outside a sound-generating or sound-conducting flux of force of the machine.

4. A sound-generating or sound-emitting machine according to claim 3, wherein the alloy phase comprises approximately 49.9 atomic % Ni and approximately 50.1 atomic % Ti.

5. A sound-generating or sound-emitting machine having a component comprising a material with a high internal damping and tensile-strength, said material comprising:

an aluminum base material; and an alloy element having a low solubility in the aluminum base material, wherein the component is arranged outside a sound-generating or sound-conducting flux of force of the machines, wherein said material is a light metal alloy.

6. A sound-generating or sound-emitting machine according to claim 1, wherein the material is reinforced with fibers.

7. A sound-generating or sound-emitting machine according to claim 6, wherein said fibers comprise mineral fibers or carbon fibers.

8. A sound-generating or sound-emitting machine according to claim 1, wherein the metallic alloy phase further comprises up to 25 atomic % of an additional element.

9. A sound-generating or sound-emitting machine according to claim 8, wherein the additional element is selected from the group consisting of zirconium, hafnium, copper, niobium, manganese, palladium, platinum, iron, and combinations thereof.

10. A sound-generating or sound-emitting machine according to claim 1, wherein the metallic alloy phase comprises at least one of particles, wires, or short fibers.

11. A sound-generating or sound-emitting machine according to claim 1, wherein the metallic alloy phase is arranged in layers.

12. A sound-generating or sound-emitting machine according to claim 1, wherein a fraction of the metallic alloy phase in the material is between 5 and 60% by volume.

13. A sound-generating or sound-emitting machine according to claim 1, wherein the base material is an Al alloy.

14. A sound-generating or sound-emitting machine according to claim 1, wherein the base material is a composite material further comprising a third phase.

15. A sound-generating or sound-emitting machine according to claim 1, wherein, on at least a boundary surface to the base material, the second phase has connections with the base material.

16. A sound-generating or sound-emitting machine according to claim 1, wherein the component is a membrane for sound radiation.

17. A sound-generating or sound-emitting machine according to claim 16, wherein the component comprises an oil pan.

18. A sound-generating or sound-emitting machine according to claim 5, wherein maximally 1% of all lattice sites or interstices of the base material are replaced by another element of the alloy.

19. A sound-generating or sound-emitting machine according to claim 5, wherein maximally 0.5% of all lattice sites or interstices of the base material are replaced by another element of the alloy.

20. A sound-generating or sound-emitting machine according to claim 18, wherein maximally 0.1% of all lattice sites or interstitials of the base material are replaced by another element of the alloy.

21. A sound-generating or sound-emitting machine according to claim 1, wherein the machine is selected from the group consisting of an airplane, a helicopter, a railway engine, a railway car, and a motor vehicle.

22. A sound-generating or sound-emitting machine according to claim 1, wherein the machine is a passenger car or a truck.

23. A sound-generating or sound-emitting machine according to claim 1, wherein the component is selected from the group consisting of:

a connecting rod, an engine block having a cylinder block and a crankcase, a cylinder head, a transmission case, an automatic transmission case, a clutch housing, an assembly mount, an engine mount, a seat rail, a seat support on which seats are disposed, a seat frame, and a differential gear.

24. A sound generating or emitting machine according to claim 2, wherein the component is selected from the group consisting of:

a timing case, a valve hood, an oil pan, a suction pipe or module, a fan blade, a steering wheel, a steering column tube, an operating element, a pedal, a covering element, a differential gear, a casing tube, and a casing of a drive shaft or a pulley.

* * * * *